Sept. 25, 1956    F. L. McCLINTOCK    2,764,673
AUTOMOBILE HEADLIGHT ATTACHMENT
Filed March 5, 1954
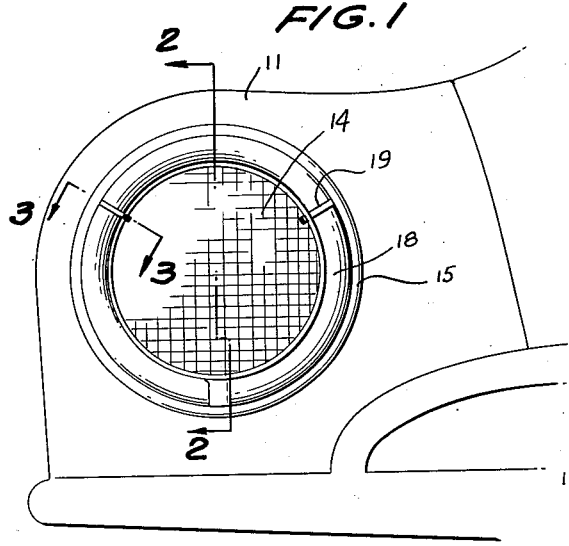
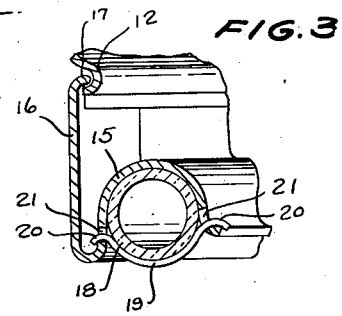
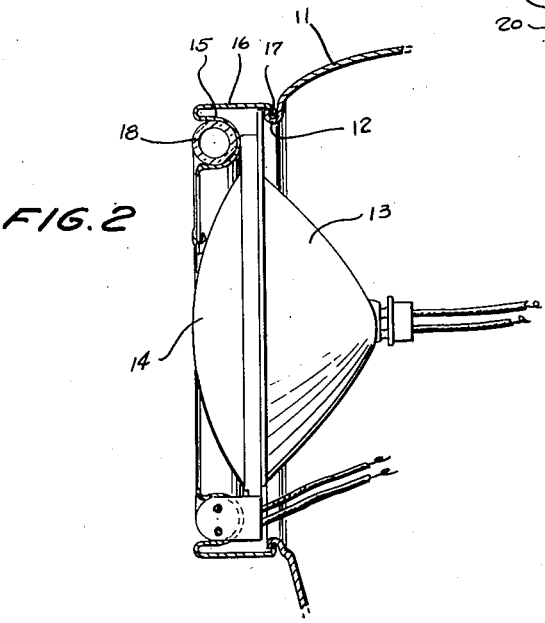
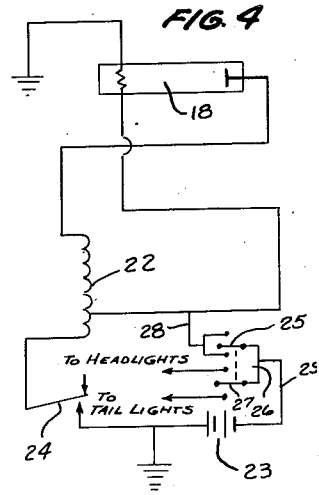
INVENTOR.
FRED L. McCLINTOCK
BY
McMorrow, Berman + Davidson
ATTORNEYS United States Patent Office 2,764,673
Patented Sept. 25, 1956

2,764,673

AUTOMOBILE HEADLIGHT ATTACHMENT

Fred L. McClintock, Fortville, Ind.

Application March 5, 1954, Serial No. 414,443

2 Claims. (Cl. 240—7.1)

This invention relates to automobile headlights, and more particularly to an auxiliary headlight attachment adapted to be employed in conjunction with the main headlight.

A main object of the invention is to provide an improved auxiliary headlight attachment adapted to be employed in conjunction with a main headlight, said attachment providing illumination around the rim of the main headlight and being usable as an emergency headlight when the main headlight fails, the attachment being simple in construction, being easy to install, and having high visibility.

A further object of the invention is to provide an improved auxiliary headlight adapted to be employed with the main headlight of an automobile, said auxiliary headlight involving inexpensive components, being durable in construction, and providing increased safety in night driving by serving as an emergency headlight having high visibility so that it can be seen from a great distance.

Further objects and advantages of the invention will become apparent from the following description and claims, and from the accompanying drawings, wherein:

Figure 1 is a front elevational view of a portion of the forward end of an automobile fender provided with a main headlight and also provided with an improved auxiliary headlight attachment constructed in accordance with the present invention.

Figure 2 is an enlarged vertical cross sectional view taken on the line 2—2 of Figure 1.

Figure 3 is an enlarged cross sectional detail view taken on the line 3—3 of Figure 1.

Figure 4 is an electrical wiring diagram illustrating the electrical connections of the auxiliary headlight disclosed in Figures 1 and 2.

Referring to the drawings, 11 designates the fender of an automobile which is formed with the trough-shaped annular rim 12 in which is mounted the conventional headlight 13, for example, a headlight of the sealed beam type. The headlight 13 includes the front lens 14 which is secured in any suitable manner to the annular rim 12.

Designated at 15 is an annular trough member having a diameter approximately the same as the outside diameter of the headlight 13 and being provided with a peripheral flange 16 formed at its end with the inturned bead 17. As shown in Figure 2, the peripheral bead 17 of the flange 16 is lockingly engaged in the annular trough 12 around the headlight opening in the fender 11, thus retaining the flange 16 and the annular trough 15 integral therewith in a position concentric with the headlight 13, the trough element 15 facing forwardly, as shown in Figure 2.

Designated at 18 is a circular tubular lamp of the fluorescent type which is seated in the trough member 15 and which is retained therein by a plurality of spaced U-shaped clamping members 19, formed of suitable wire stock, said clamping members 19 having hook-like ends 20, 20 engaged in apertures 21, 21 formed in the opposite walls of the trough member 15, as is clearly shown in Figure 3. As is shown in Figure 3, the ends of the resilient members 19 are thus detachably engaged in the opposite walls of the annular trough 15 and the resilient members 19 have their intermediate portions extending transversely over the outer surface of the circular tubular lamp 18, thus securing the lamp in the trough 15. The bulb 18 may be readily removed, whenever required, by unfastening the resilient retaining members 19, namely, by detaching the hooked ends 20 of said retaining members from the apertures 21 in the trough 15.

The bulb 18 is electrically connected in a conventional manner to the terminals of a high tension winding of a conventional transformer 22, said transformer being energized from the automobile battery 23 and including the conventional vibrator interrupter 24 for producing a pulsating current in the low tension portion of the transformer 22. The low tension winding of the transformer 22 is arranged to be energized from the battery 23 through a pole 25 of a double-pole double-throw switch 26 of the type having a center-off position, shown in the wiring diagram of Figure 4. The other pole 27 of the switch 26 is arranged to selectively engage contacts for selectively energizing either the main headlights or the tail lights of the automobile. The low tension winding of the transformer 22 will be energized when the pole 27 engages either the contact for energizing the headlights or the contact for energizing the tail lights, since the stationary contacts associated with the pole 25 are connected together and are connected by a wire 28 to the low tension winding energizing terminal of the transformer 22. The poles 25 and 27 are connected together and are connected by a wire 29 to the ungrounded terminal of the automobile battery 23. Thus, when the switch 26 is in either one of its circuit-closing positions, namely, when either the main headlights or the tail lights are energized, the ungrounded terminal of the automobile battery 23 is connected through the wire 28 to the energizing terminal of the low tension winding of transformer 22, causing the vibrator-interrupter device 24 to operate and to produce pulsating current in the transformer which is stepped up and which is applied to the lamp 18.

From the above it will be apparent that the lamp 18 will be energized when either the main headlights or the tail lights of the automobile are energized. In the event of a failure of the headlight associated therewith, the lamp 18 positioned around the headlight will continue to be energized and will provide emergency illumination which is visible from a great distance, and which thus serves as an emergency headlight means visible from a great distance to approaching drivers. Similarly, the lamps 18 serve as "dim" headlights which are energized simultaneously with the energization of the tail lights of the automobile and which serve the purpose of rendering the vehicle visible to approaching drivers under conditions of reduced daylight or under foggy or hazy conditions.

While a specific embodiment of an improved auxiliary headlight attachment for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a support having a circular rim, said support being adapted to receive a headlight, an annular outwardly facing channel element on said rim, an annular forwardly facing trough, a continuous peripheral flange on said trough larger in diameter than said channel element, a peripheral inwardly projecting continuous bead on the end of said flange lockingly engageable in said channel element, a circular tubular lamp bulb seated in said trough, and spaced clip means engaging in the opposite walls of the trough and securing said bulb in said trough, whereby said bulb externally surrounds the headlight and is directly visible from a position forwardly of the headlight.

2. In a motor vehicle, a support having a circular rim, said support being adapted to receive a headlight, an outwardly facing annular channel element on said rim, an annular forwardly facing continuous trough, a peripheral flange on said trough larger in diameter than said channel element, a peripheral inwardly projecting continuous bead on the end of said flange lockingly engageable in said channel element, a circular tubular lamp bulb seated in said trough, and a plurality of spaced U-shaped resilient clamping member having their ends detachably engaged in the opposite walls of said trough and having their intermediate portions extending transversely over the outer surface of said bulb, said clamping members securing said bulb in said trough, whereby said bulb externally surrounds the headlight and is directly visible from a position forwardly of the headlight.

References Cited in the file of this patent

UNITED STATES PATENTS

| 2,001,378 | Cornwall | May 14, 1935 |
| 2,562,740 | Rizer | July 31, 1951 |

FOREIGN PATENTS

| 488,090 | Canada | Jan. 3, 1951 |
| 655,248 | Great Britain | July 18, 1951 |